United States Patent
Ballentine et al.

(10) Patent No.: US 8,216,534 B2
(45) Date of Patent: Jul. 10, 2012

(54) WATER-IN-OIL-IN-WATER EMULSIONS OF HYDROXAMATED POLYMERS AND METHODS FOR USING THE SAME

(75) Inventors: Franklyn A. Ballentine, Stamford, CT (US); Morris Lewellyn, Stratford, CT (US)

(73) Assignee: Cytec Technology Corporation, Wilmington, DE (US)

( * ) Notice: Subject to any disclaimer, the term of this patent is extended or adjusted under 35 U.S.C. 154(b) by 0 days.

(21) Appl. No.: 13/039,566

(22) Filed: Mar. 3, 2011

(65) Prior Publication Data
US 2011/0150754 A1    Jun. 23, 2011

Related U.S. Application Data

(63) Continuation of application No. 11/361,888, filed on Feb. 24, 2006.

(60) Provisional application No. 60/656,474, filed on Feb. 25, 2005.

(51) Int. Cl.
*C01F 7/34* (2006.01)
*C08L 31/00* (2006.01)
*C08L 33/26* (2006.01)

(52) U.S. Cl. ......... 423/121; 423/625; 524/555; 524/556

(58) Field of Classification Search .................. 423/122, 423/140, 625; 524/555, 556; 525/328.2, 525/328.4, 328.5, 329.4, 374; *C01F 7/34; C08L 31/00, 33/26*
See application file for complete search history.

(56) References Cited

U.S. PATENT DOCUMENTS

| | | | |
|---|---|---|---|
| 3,345,344 A | 10/1967 | Fetscher et al. | |
| 3,827,500 A | 8/1974 | Reed | |
| 4,045,357 A | 8/1977 | Reed | |
| 4,480,067 A | 10/1984 | Vio et al. | |
| 4,532,046 A | 7/1985 | Meunier et al. | |
| 4,536,296 A | 8/1985 | Vio | |
| 4,587,306 A | 5/1986 | Vio et al. | |
| 4,767,540 A | 8/1988 | Spitzer et al. | |
| 5,041,269 A | 8/1991 | Moody et al. | |
| 5,141,730 A | 8/1992 | Heitner | |
| 5,332,595 A | 7/1994 | Gaonkar | |
| 5,516,435 A | 5/1996 | Lewellyn | |
| 5,807,757 A | 9/1998 | Andrianov et al. | |
| 6,527,959 B1 * | 3/2003 | Quadir et al. | 210/727 |
| 6,608,137 B1 | 8/2003 | Heitner et al. | |

FOREIGN PATENT DOCUMENTS

| | | |
|---|---|---|
| AU | 667390 | 3/1996 |
| CA | 825234 | 10/1969 |
| EP | 0314855 | 1/1988 |
| GB | 2171127 | 8/1986 |
| WO | 9300160 | 1/1993 |
| WO | 9605146 | 2/1996 |
| WO | 9717292 | 5/1997 |
| WO | 9741064 | 11/1997 |
| WO | 9741065 | 11/1997 |

OTHER PUBLICATIONS

Sugiura et al., (Journal of Colloid and Interface Science (2004), 270: 221-228.
Garti (Colloids and Surfaces A: physicochemical and engineering aspects (1997) 223-246.

* cited by examiner

*Primary Examiner* — Melvin C Mayes
*Assistant Examiner* — Jun Li
(74) *Attorney, Agent, or Firm* — Michaud-Kinney Group LLP

(57) ABSTRACT

A method and composition for flocculation and separation of suspended solids from an industrial process stream containing suspended solids is provided. The method includes the steps of adding to the stream a water-in-oil-in-water emulsion polymer in an amount effective to flocculate the suspended solids and separating the flocculated solids therefrom. The composition is a water-in-oil-in-water emulsion of a water-soluble polymer in which the continuous phase is an aqueous solution of a water-soluble salt.

13 Claims, No Drawings

WATER-IN-OIL-IN-WATER EMULSIONS OF HYDROXAMATED POLYMERS AND METHODS FOR USING THE SAME

CROSS REFERENCE TO RELATED APPLICATIONS

This application is a continuation application of U.S. patent application Ser. No. 11/361,888 entitled "Water-in-Oil-in-Water Emulsions of Hydroxamated Polymers and Methods for Using the Same" filed on Feb. 24, 2006, which claims priority to U.S. Provisional Patent Application No. 60/656,474, filed on Feb. 25, 2005, the entireties of which are incorporated herein by reference.

FIELD

The present invention relates to flocculants and methods for using them and more particularly to hydroxamated polymer emulsion flocculants and methods for flocculating process solids in industrial process streams. The flocculants and methods of the present invention find use in such industrial processes as the Bayer process for the recovery of alumina from bauxite ore.

BACKGROUND

Industrial processes that utilize liquid media most often employ solids-liquid separation techniques. In the case of aqueous systems, flocculants are often used to improve the separation process. These processes are practiced in diverse industries such as in the separation of mineral solids from aqueous systems, in the production of pulp and paper and for the treatment of paper wastes as well as for the treatment of industrial and municipal wastes. Currently flocculants are manufactured and sold either as solid powder forms which are difficult to dissolve, or as liquid forms which are easier to handle and use. Liquid forms include water-in-oil emulsions of water-soluble polymers. These have been used for many decades in many diverse industrial applications. However, these product forms suffer from several drawbacks. One of the problems of using the water-in-oil product form occurs when low temperatures (below the freezing point of the emulsion) are encountered. Often, the water-in-oil elusion will invert during the thawing process forming insoluble gels which renders the product unusable. Aqueous solutions of water-soluble polymers also tend to freeze when exposed to low temperatures making them unsuitable for adverse climates. The water-in-oil emulsion forms also suffer from the need to predilute in an aqueous medium prior to use thus adding to the cost for storage tanks and specialized dissolution equipment. When the process is a Bayer process, the pre-dilution step results in an additional problem since it adds water to the process necessitating the addition of additional caustic soda in order to maintain the alkalinity of the system.

There is therefore a need for improved flocculant product forms which can be used in industrial processes to overcome these shortcomings.

The Bayer process is almost universally used to manufacture alumina from bauxite. In this process, raw bauxite ore is first heated with caustic soda solution at temperatures in the range of 140 to 250° C. This results in the dissolution (digestion) of most of the aluminum-bearing minerals, especially the alumina trihydrate $Al(OH)_3$ (gibbsite) and alumina monohydrate boehmite, to give a supersaturated solution of sodium aluminate (pregnant liquor). Resulting concentrations of dissolved materials are very high, with sodium hydroxide concentrations being greater than 150 grams/liter and dissolved alumina being greater than 120 g/l. Any undissolved solids, usually oxides of iron which are known as red muds, are then physically separated from the aluminate solution. Typically a polymeric flocculant is used to enhance the settling and removal of the fine solid particles. Residual suspended solids are removed by a filtration step. The filtered clear solution or liquor is cooled and seeded with alumina trihydrate to precipitate a portion of the dissolved alumina. After alumina precipitation, this depleted or spent liquor is reheated and reused to dissolve more fresh bauxite.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor. The alumina trihydrate crystals are generally separated from the liquor in which they are formed by settling and/or filtration. Coarse particles settle easily, but fine particles settle slowly resulting in yield losses. Fine particles can also blind the filters. The fine particles of alumina trihydrate which do not settle easily, are most often recycled back to digestion with the spent liquor. The un-recovered alumina trihydrate is then redigested and reprecipitated in a second cycle through the Bayer process, unnecessarily expending energy and reducing the alumina extraction capacity of the spent liquor. It is therefore highly desirable to settle as much of the trihydrate as possible so as to limit the adverse consequences of these problems.

Canadian Patent No. 825,234, October 1969, uses dextran, dextran sulfate and combinations therewith containing anionic salts to improve the flocculation and filtration of alumina trihydrate from alkaline solutions thereof. U.S. Pat. No. 5,041,269, August 1991, Moody et al., uses a flocculant for the recovery of alumina trihydrate crystals comprising a combination of dextran, or certain other polysaccharides, together with an anionic flocculant polymer including acrylic monomer. Dextran has however proved to be a poor flocculant for trihydrate crystals resulting in poor supernatant clarities.

U.S. Pat. No. 4,767,540 describes the use of hydroxamated polymers for flocculating suspended solids in the Bayer process. Australian patent application AU-B-46114/93 describes the use of certain hydroxamated polymers for the clarification of hydrate solids in the Bayer process.

U.S. Pat. No. 6,608,137 describe water-in-oil emulsions of hydroxamated polymers. These polymers must firstly be dissolved and pre-diluted in an aqueous medium (often a Bayer process liquor) before they may be added to the Bayer process liquor to be settled/clarified.

Thus it is an objective of this invention to provide new high performance compositions of matter, water-in-oil-in-water dispersions of water-soluble polymers, which can be added directly into industrial process streams such as Bayer process steams without predilution thus eliminating the need for expensive storage vessels and associated pumping and dilution equipment. The water-in-oil-in-water emulsions of a hydroxamated polymer of the current invention also exhibit enhanced storage stability over prior art solution and water-in-oil emulsion polymers particularly when subject to extremes of low temperature.

It is also an object of the present invention to provide a more effective Bayer process wherein flocculation, settling, clarification and separation of Bayer process solids, including alumina trihydrate and red mud solids from the process streams is improved by adding to the process stream a water-in-oil-in-water emulsion of a hydroxamated polymer.

These and other objects of the present invention are described in detail below.

SUMMARY

One aspect described herein relates to a method for flocculation and separation of suspended solids from an industrial process stream containing suspended solids comprising the steps of: adding to the stream a water-soluble polymer in an amount effective to flocculate the suspended solids; and separating the flocculated solids therefrom, wherein the water-soluble polymer is a water-in-oil-in-water emulsion polymer.

Another aspect described herein relates to a composition comprising a water-in-oil-in-water emulsion of a water-soluble polymer in which the continuous phase is an aqueous solution of a water-soluble salt.

These and other aspects are described in more detail herein.

DETAILED DESCRIPTION

In one embodiment, the present invention provides a composition of a water-in-oil-in-water emulsion of a water-soluble polymer in which the continuous aqueous or water phase is comprised of an aqueous solution of water-soluble salt. Preferably the water-in-oil-in-water emulsion of a water-soluble polymer is a water-in-oil-in-water emulsion of a hydroxamated polymer. The discontinuous phase is a water-in-oil emulsion of a water-soluble polymer preferably a water-soluble hydroxamated polymer. The terms emulsion, microemulsion or dispersion are used synonymously to indicate that the polymer is present in the form of small particles or droplets dispersed in a continuous oil phase of the oil-in-water emulsion. The particle size can range from 0.01 microns to 50 microns and can be in the form of a microemulsion or microdispersion. The particles may also contain little or some water ranging from 0-90% the remainder being polymer. Preferably the particle size range is 0.05 to 10 microns. The hydroxamated water-in-oil-in-water emulsions of the present invention can be prepared by mixing a water-in-oil emulsion or dispersion of a hydroxamated polymer with an aqueous solution of water-soluble salt. The water soluble salt can be any salt which prevents the polymer from dissolving. Preferably the salt is a salt containing aluminum or calcium.

According to another aspect of the invention, there is provided an improved method for the flocculation, clarification and separation of solids from an industrial process stream comprising adding to the process stream a water-in-oil-in-water emulsion or dispersion of a water-soluble polymer. When the process stream is a Bayer process stream, the solids consist of as red mud (waste) or alumina trihydrate solids (product). The water-in-oil-in-water emulsion or dispersion of the water-soluble polymer is added in an amount effective to improve the clarification of said process stream by reducing the amount of suspended solids present in the supernatant. When the process is a Bayer process stream the preferred flocculant is a water-in-oil-in-water emulsion of a hydroxamated polymer but can include other flocculants such as polymers of acrylic acid.

Hydroxamated polymers are well known to those skilled in the art and are specifically disclosed, as are methods for their production, in U.K. Patent Application 2171127 and U.S. Pat. Nos. 3,345,344; 4,480,067; 4,532,046; 4,536,296 and 4,587,306, 4,767,540, and 6,608,137 which are hereby incorporated herein by reference. Generally, these hydroxamated polymers may be produced by reacting a pendant reactive group, in solution, with a hydroxylamine or its salt at a temperature ranging from about 50° C. to 100 C. From about 1-90% of the available pendant reactive groups of the polymer may be replaced by hydroxamic groups in accordance with said procedures.

The water-in-oil-in-water emulsions of polymers of this invention may be prepared by adding to an aqueous solution of water-soluble salt, a water-in-oil emulsion of a polymer most preferably a hydroxamated polymer. Preferably, the order of addition may be reversed, i.e., the aqueous solution of water-soluble salt may be added to the water-in-oil emulsion of a polymer which is most preferably a hydroxamated polymer. Alternatively the order of addition may be reversed i.e. the aqueous solution of water-soluble salt may be added to the water-in-oil emulsion of a hydroxamated polymer. Preferably the polymer is a hydroxamated polymer when the substrate to be treated is a Bayer process stream. Methods of preparation of water-in-oil emulsion of a hydroxamated polymer are described in U.S. Pat. No. 6,608,137 which is hereby incorporated herein by reference. Generally a backbone polymer is prepared by forming a water-in-oil emulsion of a water-soluble monomer such as acrylamide by dispersing the monomer phase within an oil and surfactant phase and conducting the polymerization in the absence of oxygen by conventional polymerization techniques e.g. by the addition of redox, thermal e.g. azo initiators or by the application of UV irradiation in the presence of UV initiators. The polymeric backbone is then reacted with hydroxylamine to form the hydroxamated polymer. The concentration of hydroxamated polymer present in the water-in-oil emulsion of hydroxamated polymer can range from 1-60% usually in the range from 10-30%. The concentration of salt present in the aqueous solution should be such as to prevent dissolution of the water-in-oil dispersion of a hydroxamated polymer. A preferred range for the concentration of water-soluble salt is from 0.1-10% based on the water-in-oil-in-water emulsion. Most preferably the range is 1-5%. Suitable water-soluble salts include sodium aluminate, aluminum sulfate, sodium chloride, potassium chloride and the like. Aluminum salts are preferred. The ratio of water-in-oil emulsion of a hydroxamated polymer to aqueous solution of water-soluble salt that is used to prepare the water-in-oil-in-water dispersion of a hydroxamated polymer can range from 1:99 to 99:1, preferably 10:90 to 90:10 most preferably 20-50%.

Any water-in-oil emulsion of hydroxamic polymer may be used. The hydroxamic polymers, or hydroxamated polymers, are well known in the art and can be prepared by post-polymerization derivatization from polymers containing pendant reactive groups, such as pendant ester, amide, anhydride and nitrile groups and the like by the reaction thereof with hydroxylamine or its salt at a temperature within the range of from about 20 degrees C. to about 100 degrees C. for several hours. Monomers suitable for the preparation of precursor polymers include acrylamide and esters of (meth)acrylic acid such as methyl acrylate. From about 1 to about 90 mole percent of the available pendant reactive groups of the precursor polymer may be replaced by hydroxamic groups in accordance with such procedures. Such post-polymerization derivatization may be carried out in water-in-oil emulsion or dispersion form as described in U.S. Pat. No. 6,608,137. The molecular weight of the hydroxamated polymer can range from 1000 to $50 \times 10^6$. The hydroxamated polymer preferably has a weight average molecular weight of at least about 0.1 million, preferably with an IV of from about 0.5 to about 40 dl/g when measured in M NaCl at 30 degrees C.

The degree of hydroxamation, may vary from about 1 to about 90 mole percent, and preferably is within the range of from about 5 to about 75 mole percent, and most preferably from about 10 to about 50 mole percent.

The hydroxamated polymer in the preferred embodiment is predominantly anionic, although it can also contain nonionic or cationic units. Anionic monomer units other than the hydroxamic monomer units can be incorporated into the polymer and are generally carboxylic acids or sulphonic acids and are usually derived from (meth)acrylic acids, sulfoalkyl acrylamides, such as 2-sulfopropylacrylamide or acrylamidodimethylpropylsulfonic acid.

The polymers used in the present invention are employed by adding them, either directly to the process stream as water-in-oil-in-water emulsion of a hydroxamated polymer or in the form of pre-diluted aqueous solutions. The process stream can be any industrial process stream from which solids need to be separated. These processes may include mineral beneficiation processes such as is used in the extraction of alumina, phosphate, and other industrial minerals, copper, zinc, lead, and precious metals, in the production of pulp and paper, for the treatment of paper wastes as well as for the treatment of industrial and municipal wastes. Preferably the process stream is a Bayer process steam e.g., one containing red mud or alumina trihydrate solids. The water-in-oil-in-water emulsion of a hydroxamated polymer is added to the process stream containing red mud or alumina trihydrate solids in an amount at least sufficient to settle said suspended solids. Generally, for best results, at least about 0.1 mg of the hydroxamated polymer, per liter of the process stream should be employed. More preferably, at least 1.0 mg of the hydroxamated polymer is added. It is understood, that higher amounts than those just stated may be employed without departing from the scope of the invention, although generally a point is reached in which additional amounts of hydroxamated polymer do not improve the separation rate over already achieved maximum rates, Thus, it is uneconomical to use excessive amounts when this point is reached.

The addition of the water-in-oil-in-water emulsion of hydroxamated polymer improves the supernatant clarity thereby reducing the amount of suspended solids which are typically very fine. Improving supernatant clarity minimizes alumina trihydrate losses and improves supernatant filtration by reducing filter blinding, or eliminates the need for filtration.

It is also believed that the hydroxamated polymer clarification aid will improve the alumina-caustic liquor separation on a vacuum filter by forming a more porous filter cake.

When the process stream is a red mud stream, superior settling rates and supernatant clarities are achieved compared to prior art polymers. Also, it has surprisingly been found that the water-in-oil-in-water hydroxamated polymer emulsions of the instant invention are more effective flocculants for treating red muds which are contaminated with silicon containing minerals commonly known as desilication products or DSP.

COMPARATIVE EXAMPLE A

Superfloc® HF80 is a commercially available water-in-oil emulsion containing polymer having about 60 mole % of hydroxamate groups. It is manufactured by Cytec Industries Inc. of Garret Mountain, N.J.

EXAMPLES 1-6

Preparation of Hydroxamated Water-in-Oil-in-Water Polymer Emulsions

Six (6) samples of stable hydroxamated water-in-oil-in-water polymer emulsions are prepared by using the following procedure. Concentrations of components in each of the six samples are shown in Table 1. Powdered sodium aluminate trihydrate ($Na_2O \cdot Al_2O_3 \cdot 3H_2O$) and sodium hydroxide are dissolved in de-ionized water. Superfloc® HF80 is then added rapidly to a vigorously stirred solution of the sodium aluminate and sodium hydroxide to form stable water-in-oil-in-water emulsions of hydroxamated polymer.

TABLE 1

| Example | Parts 100% $Na_2O \cdot Al_2O_3 \cdot 3H_2O$ | % $Na_2O \cdot Al_2O_3 \cdot 3H_2O$ in formulation | Parts 100% NaOH | % NaOH in formulation | Parts De-ionized water | Parts Example A | % Example A in the Formulation | Final formulation pH | Bulk Viscosity (cps) |
|---|---|---|---|---|---|---|---|---|---|
| 1 | 10 | 3.3 | 1.2 | 0.4 | 228.8 | 60 | 20 | 12.4 | 58 |
| 2 | 10 | 3.3 | 0.6 | 0.2 | 229.4 | 60 | 20 | 12.3 | 1880 |
| 3 | 10 | 3.3 | 0.6 | 0.2 | 139.4 | 150 | 50 | 12.4 | 705 |
| 4 | 10 | 3.3 | 1.8 | 0.6 | 138.2 | 150 | 50 | 12.4 | 1072 |
| 5 | 10 | 3.3 | 1.2 | 0.4 | 183.8 | 105 | 35 | 12.3 | 902 |
| 6 | 6 | 2 | 1.2 | 0.4 | 142.8 | 150 | 50 | — | Not measured |

EXAMPLES 7-15

Preparation of Hydroxamated Water-in-Oil-in-Water Polymer Emulsions

Stable water-in-oil-in-water emulsions of hydroxamated polymers are prepared by using the following procedure. A solution of 250 grams/liter of aluminum sulfate hydrate ($Al_2(SO_4)_3 \cdot 18H_2O$) and 100% sodium hydroxide are dissolved in deionized water. Example A is then added rapidly to the vigorously stirred caustic aluminum sulfate solution. Table 2 lists several water-in-oil-in-water formulations that are prepared by this procedure.

TABLE 2

| Example | Parts 250 g/l Aluminum sulfate soultion | Parts Al$_2$(SO$_4$)$_3$•18H$_2$O in formulation | % Al$_2$(SO$_4$)$_3$•18H$_2$O in formulation | Parts NaOH in formulation | % NaOH in formulation | Parts De-ionized water | Parts Example A in formulation | % Example A in the Formulation | Final formulation pH | Bulk Viscosity (cps) |
|---|---|---|---|---|---|---|---|---|---|---|
| 7  | 24 | 6  | 2   | 1.8 | 0.6 | 169.2 | 105 | 35 | 11.9 | 1040 |
| 8  | 40 | 10 | 3.3 | 1.8 | 0.6 | 108.2 | 150 | 50 | 11.4 | 762 |
| 9  | 40 | 10 | 3.3 | 1.2 | 0.4 | 153.8 | 105 | 35 | 10.8 | 765 |
| 10 | 40 | 10 | 3.3 | 0.6 | 0.2 | 199.4 | 60  | 20 | 9.6  | 117 |
| 11 | 40 | 10 | 3.3 | 1.8 | 0.6 | 198.2 | 60  | 20 | 10.3 | 32 |
| 12 | 24 | 6  | 2   | 1.2 | 0.4 | 214.8 | 60  | 20 | 11.1 | 45 |
| 13 | 24 | 6  | 2   | 1.2 | 0.4 | 124.8 | 150 | 50 | 11.8 | 1145 |
| 14 | 24 | 6  | 2   | 1.2 | 0.4 | 169.8 | 105 | 35 | 11.5 | 835 |
| 15 | 40 | 10 | 3.3 | 0.6 | 0.2 | 109.4 | 150 | 50 | 11   | 840 |

EXAMPLE 16

Preparation of a Hydroxamated Water-in-Oil-in-Water Polymer Emulsion

A stable water-in-oil-in-water hydroxamated polymer emulsion is prepared by using the following procedure. One hundred fifty (150) parts of a solution of aluminum sulfate is added with vigorous stirring and at a constant rate over 30 to 40 minutes to 150 parts of Example A. The aluminum sulfate solution is prepared using 18.6 parts of 48% aluminum sulfate hydrate (Al$_2$(SO$_4$)$_3$.14H$_2$O) and 131.4 parts of deionized-water. The concentration of Example A in the final product is 50%, and the concentration of Al$_2$(SO$_4$)$_3$.14H$_2$O is 2.97%. The final product bulk viscosity is 780 cps and the pH is 10.1. This example demonstrates that the aqueous phase can be added to the water-in-oil hydroxamated polymer emulsion to produce a stable water-in-oil-in-water hydroxamated polymer emulsion.

EXAMPLE 17

Preparation of Hydroxamated Water-in-Oil-in-Water Polymer Emulsion

A stable water-in-oil-in-water hydroxamated polymer emulsion is prepared by using the following procedure. One hundred fifty (150) parts of a 2.2% solution of calcium chloride (CaCl$_2$) in DI-water is added with vigorous stirring and at a constant rate over 43 minutes, to 150 parts Example A. The concentration of Example A in the final product is 50%, and the concentration of CaCl$_2$ is 1.1%. The final product, stable water-in-oil-in-water hydroxamated polymer emulsion had a bulk viscosity of 10,750 cps and pH of 10.1.

EXAMPLE 18

Example 15 is thermally cycled for 4 cycles from room temperature to a temperature of between –20° C. and –30° C. to simulate freeze-cycles to which the product could be subjected to when used in extreme climates. After thawing to room temperature the product is remixed to form of stable water-in-oil-in water emulsion of hydroxamated polymer.

EXAMPLES 19-21

The solubility of water-in-oil-in-water hydroxamated polymer emulsions of Examples 8 and 15 is compared to the solubility of Example A in 150 g/l sodium hydroxide in DI water at 60° C. These conditions are similar to the conditions found in the tertiary tray feed in an alumina refinery where precipitated alumina trihydrate is flocculated, settled and separated from the liquor. The torque/viscosity build up of the solution is measured by using a mixing motor capable of increasing torque to maintain the stirring speed as the viscosity increased. Table 3 shows that comparative Example A (Example 20) did not dissolve in the simulated tertiary tray feed liquor whereas the water-in-oil-in-water hydroxamated polymer emulsions of the instant invention rapidly dissolved (Examples 19, 21). Therefore the water-in-oil-in-water hydroxamated polymer emulsions can be added directly to the Bayer process stream without the use of an additional dilution step.

TABLE 3

| Examples | Sample | Time to maximum torque |
|---|---|---|
| 19 | Example 15 | Maximum torque in 50 seconds |
| 20 | Example A  | No torque increase in 5 minutes |
| 21 | Example 8  | Maximum torque in 100 seconds |

EXAMPLES 22-29

The flocculation performance of Example 1 is compared to that of two commercial prior art alumina hydrate flocculants, dextran and Example A, in simulated tertiary tray feed as shown in table 4. The slurry is prepared using spent liquor from an alumina refinery. The spent liquor is saturated with 74.8 g/l of alumina at its boiling point. The solution is then cooled and held at 70° C. and then 34 g/l of alumina is suspended in the liquor. The flocculants are diluted to 0.01% polymer concentration to aid in delivering very low doses. A 200 milliliter aliquot of the slurry is then treated with the flocculants. The settling time and supernatant clarity are measured as a function of dose. Table 1 shows that water-in-oil-in-water hydroxamated polymer emulsions are effective trihydrate flocculants.

TABLE 4

| Example | Polymer | Polymer Dose (ppm) | Settling time (sec) | Supernatant clarity (NTU) |
|---|---|---|---|---|
| Example 22 | Example A | 0.75 | 58  | 286 |
| Example 23 | Dextran   | 0.75 | 160 | >1000 |
| Example 24 | Example 1 | 0.75 | 84  | 861 |
| Example 25 | Example A | 1.5  | 37  | 236 |
| Example 26 | Dextran   | 1.5  | 81  | >1000 |
| Example 27 | Example 1 | 1.5  | 62  | 388 |
| Example 28 | Dextran   | 2.25 | 52  | >1000 |
| Example 29 | Example 1 | 2.25 | 55  | 271 |

EXAMPLES 30-38

The flocculation performance of water-in-oil-in-water hydroxamated polymer emulsions, Example 11 and 15 are compared to that of two commercial prior art hydrate flocculants, dextran and Example A, in tertiary tray feed obtained from an alumina refinery. The tray feed temperature is measured at 70° C. and had a caustic content 228 gram/liter. The flocculants are all added to the tertiary tray feed without pre-dilution. The flocculants are added to 1 liter of tertiary tray slurry in a 1 liter graduated cylinder. The flocculant and slurry are thoroughly mixed with 10 up and down strokes of a plunger (perforated disk of slightly smaller diameter than that of the cylinder with a ⅛ inch rod attached to the center of one side of the disk). The interface of the settling hydrate is timed from the 900 to 700 milliliter graduations. The supernatant clarity is also measured 1 minute after the mixing stopped. Table 5 lists the results of these experiments and shows that the water-in-oil-in-water hydroxamated polymer emulsions of the instant invention perform much better than the prior art flocculants.

TABLE 5

Alumina Trihydrate settling tests

| Example | Polymer | Polymer Dose (ml) | Polymer dose (ppm) | Settling time (sec) | Supernatant clarity (NTU) |
|---|---|---|---|---|---|
| Example 30 | Dextran | 0.8 | 800 | 24 | 383 |
| Example 31 | Example 15 | 0.8 | 800 | 4 | 303 |
| Example 32 | Example 11 | 0.8 | 800 | 11 | 265 |
| Example 33[1] | Example 11 | 0.8 | 800 | 10 | 374 |
| Example 34 | Dextran | 0.4 | 400 | 20 | 300 |
| Example 35 | Example 15 | 0.4 | 400 | 3 | 323 |
| Example 36 | Example 11 | 0.4 | 400 | 13 | 287 |
| Example 37 | Example A Comparative | 0.4 | 400 | 93 | 650 |
| Example 38 | No polymer | 0 | 0 | 129 | 806 |

[1] only five up and down stroke of the plunger used for mixing

The flocculation of red mud obtained from an alumina refinery digester blow-off with water-in-oil-in-water hydroxamated polymer emulsions (Example 11 and 15) is demonstrated in Table 6. The blow-off solids is 39.3 grams/liter, blow-off temperature is >100° C., caustic concentration is 204 grams/liter and the alumina to caustic ratio (A/C) is 0.675. Example 11 and 15 are all added to the blow-off process stream without pre-dilution. The flocculants are added to 1 liter samples of digester blow-off in a 1 liter graduated cylinder. The flocculant and slurry are thoroughly mixed with 5 or 10 up and down strokes of a plunger (perforated disk of slightly smaller diameter than that of the cylinder with a ⅛ inch rod attached to the center of one side of the disk). The interface of the settling hydrate is timed from the 900 to 700 milliliter graduations. Table 6 shows that water-in-oil-in-water hydroxamated polymer emulsions can be added directly to a Bayer process steam containing red mud solids without the need for a predilution step.

TABLE 6

Red Mud settling

| Example # | Polymer | Polymer Dose (ml) | Polymer Dose (ppm) | Settling Time (sec) | Settling Rate (ft/hr) |
|---|---|---|---|---|---|
| Example 39 | Example 15 | 0.2 | 200 | 37.2 | 22.85 |
|  | Example 15 | 0.4 | 400 | 15.1 | 56.29 |
|  | Example 15 | 0.6 | 600 | 14.8 | 57.43 |
|  | Example 15 | 1 | 1000 | 5.8 | 146.55 |
| Example 40 | Example 11 | 0.2 | 200 | 22.4 | 37.95 |
|  | Example 11 | 0.4 | 400 | 15.9 | 53.46 |
|  | Example 11 | 0.6 | 600 | 11.1 | 76.58 |
|  | Example 11 | 1 | 1000 | 8.8 | 96.59 |

EXAMPLE 41

Preparation of a Hydroxamated Water-in-Oil-in-Water Polymer Emulsion

A stable water-in-oil-in-water hydroxamated polymer emulsion was prepared by using the following procedure. 150 parts of aluminum sulfate hydrate ($Al_2(SO_4)_3 \cdot 14H_2O$) was dissolved in 177.5 parts of DI water. This was added with vigorous stirring to 105 parts Example A.

EXAMPLE 42

Preparation of a Hydroxamated Water-in-Oil-in-Water Polymer Emulsion

Following the procedure of Example 41, a stable water-in-oil-in-water hydroxamated polymer emulsion was prepared from a water-in-oil emulsion of a commercially available water-in-oil emulsion of a hydroxamated polyacrylamide similar to Example A except that the degree of hydroxamation was about 25 mole %. This is designated Comparative Example B.

EXAMPLES 43-54

Red Mud Flocculation Tests

Table 7 shows the results of red mud settling tests comparing the performance of Examples 41 and 42 water-in-oil-in-water hydroxamated polymer emulsions of the present invention with that of prior art products. The data clearly show that the polymers of the instant invention yield superior settling rates and clarities (lower NTU).

TABLE 7

| Example | | Polymer | Polymer Dose grams/ton | Settling rate ft/hour | Supernatant clarity (NTU) |
|---|---|---|---|---|---|
| 43 | Comparative | Example A | 37.50 | 2.70 | >1000 |
| 44 | Invention | Example 41 | 37.50 | 4.10 | 343.00 |
| 45 | Comparative | Example A | 50.00 | 3.90 | 704.00 |
| 46 | Invention | Example 41 | 50.00 | 6.50 | 222.00 |
| 47 | Comparative | Example A | 62.50 | 4.70 | 504.00 |
| 48 | Invention | Example 41 | 62.50 | 7.30 | 150.00 |
| 49 | Comparative | Example B | 18.80 | 1.40 | >1000 |
| 50 | Invention | Example 42 | 18.80 | 3.10 | >1000 |
| 51 | Comparative | Example B | 25.00 | 6.70 | >1000 |
| 52 | Invention | Example 42 | 25.00 | 8.10 | 878.00 |
| 53 | Comparative | Example B | 37.50 | 12.90 | 858.00 |
| 54 | Invention | Example 42 | 37.50 | 16.90 | 674.00 |

EXAMPLES 55-58

Red mud settling tests similar to Examples 43-54 were carried out except that 7.5%, based on red mud solids, of a synthetic desilication product (DSP) commonly found as a contaminant in red mud circuits in the Bayer process was added to the liquor. The data clearly show that the polymers of the instant invention yield superior settling rates and clarities (lower NTU) even when DSP is present.

TABLE 8

| Example | | Polymer | Polymer Dose grams/ton | Settling rate ft/hour | Supernatant clarity (NTU) |
|---|---|---|---|---|---|
| 55 | Comparative | Example A | 45.50 | 1.70 | 994.00 |
| 56 | Invention | Example 41 | 45.50 | 3.90 | 260.00 |
| 57 | Comparative | Example B | 27.30 | 3.40 | >1000 |
| 58 | Invention | Example 42 | 27.30 | 4.60 | >1000 |

What is claimed is:

1. A method for flocculation and separation of suspended solids from an industrial process stream containing suspended solids, the method comprising the steps of:
    adding to the industrial process stream a stable water-in-water-in-oil emulsion of a water-soluble polymer in an amount effective to flocculate the suspended solids; and
    separating the flocculated solids from the industrial process stream.

2. A method as in claim 1 wherein the process stream is a Bayer process stream.

3. A method as in claim 2 wherein the polymer is a hydroxamated polymer.

4. A method of claim 2 in which the process stream is alumina trihydrate process stream.

5. A method of claim 2 in which the process stream is red mud process stream.

6. A method of claim 3 in which the hydroxamated polymer is a polymer of acrylamide.

7. A method of claim 3 in which the continuous phase of the stable water-in-oil-in-water emulsion of the hydroxamated polymer contains a water-soluble salt.

8. A method of claim 7 in which the water-soluble salt comprises an aluminum or calcium salt.

9. A method of claim 3 in which the process stream is alumina trihydrate process stream.

10. A method of claim 3 in which the process stream is red mud process stream.

11. A method of claim 3 in which the stable water-in-oil-in-water emulsion of the hydroxamated polymer is prepared by mixing in any order a hydroxamated water-in-oil emulsion polymer with a solution of a water-soluble salt comprising of an aluminum or calcium salt.

12. A method for flocculation and separation of suspended solids from an industrial process stream containing suspended solids, the method comprising the steps of:
    adding to the stream a stable water-in-water-in oil emulsion of a water-soluble polymer in an amount effective to flocculate the suspended solids, a continuous phase of the stable water-in-oil-in-water emulsion is an aqueous solution of a water soluble salt, the hydroxamated polymer present in a concentration of at least 1 wt% based on a total weight of the water-in-oil-in-water emulsion; and
    separating the flocculated solids from the industrial process stream.

13. A method for flocculation and separation of suspended solids from an alumina trihydrate process stream containing suspended solids, the method comprising the steps of:
    adding to an alumina trihydrate process stream a stable water-in-water-in-oil emulsion of a water-soluble polymer in an amount effective to flocculate the suspended solids; and
    separating the flocculated solids from the alumina trihydrate process stream.

* * * * *

UNITED STATES PATENT AND TRADEMARK OFFICE
CERTIFICATE OF CORRECTION

PATENT NO. : 8,216,534 B2
APPLICATION NO. : 13/039566
DATED : July 10, 2012
INVENTOR(S) : Franklyn A. Ballentine and Morris Llewellyn It is certified that error appears in the above-identified patent and that said Letters Patent is hereby corrected as shown below:

Claim 1, col. 11, lines 24-25, delete the phrase "water-in-water-in-oil" and replace it with "water-in-oil-in-water".

Claim 7, col. 12, line 1, delete the first "the" and replace with "a" so it reads "a continuous phase".

Claim 11, col. 12, line 13, replace "comprising of" with "comprising".

Claim 12, col. 12, line 18, delete the phrase "water-in-water-in-oil" and replace it with "water-in-oil-in-water".
    col. 12, line 19, insert the word --hydroxamated-- so it reads "water-soluble hydroxamated polymer".
    col. 12, line 24, insert the word --stable-- so it reads "the stable water-in-oil-in-water emulsion".

Claim 13, line 31, delete the phrase "water-in-water-in-oil" and replace it with "water-in-oil-in-water".

Signed and Sealed this
Twenty-eighth Day of August, 2012

David J. Kappos
*Director of the United States Patent and Trademark Office*

UNITED STATES PATENT AND TRADEMARK OFFICE
CERTIFICATE OF CORRECTION

PATENT NO. : 8,216,534 B2
APPLICATION NO. : 13/039566
DATED : July 10, 2012
INVENTOR(S) : Franklyn A. Ballentine and Morris Llewellyn Page 1 of 1

It is certified that error appears in the above-identified patent and that said Letters Patent is hereby corrected as shown below:

Claim 1, col. 11, lines 24-25, delete the phrase "water-in-water-in-oil" and replace it with "water-in-oil-in-water".

Claim 7, col. 12, line 1, delete the first "the" and replace with "a" so it reads "a continuous phase".

Claim 11, col. 12, line 13, replace "comprising of" with "comprising".

Claim 12, col. 12, line 18, delete the phrase "water-in-water-in-oil" and replace it with "water-in-oil-in-water".
    col. 12, line 19, insert the word --hydroxamated-- so it reads "water-soluble hydroxamated polymer".
    col. 12, line 24, insert the word --stable-- so it reads "the stable water-in-oil-in-water emulsion".

Claim 13, col. 12, line 31, delete the phrase "water-in-water-in-oil" and replace it with "water-in-oil-in-water".

This certificate supersedes the Certificate of Correction issued August 28, 2012.

Signed and Sealed this
Eighteenth Day of September, 2012

David J. Kappos
*Director of the United States Patent and Trademark Office*